(12) United States Patent
Gherardini

(10) Patent No.: US 6,874,945 B2
(45) Date of Patent: Apr. 5, 2005

(54) OPTIC FIBER CONNECTION SYSTEM WITH TERMINUS-HOLDING BODY SLIDABLE IN HOUSING

(75) Inventor: Stephen Daniel Gherardini, Harrisburg, PA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/658,235

(22) Filed: Sep. 8, 2003

(65) Prior Publication Data

US 2005/0041930 A1 Feb. 24, 2005

(51) Int. Cl.[7] .............................. G02B 6/38; G02B 6/00
(52) U.S. Cl. ........................................ 385/59; 385/139
(58) Field of Search .............................. 385/59, 86, 88, 385/60, 78, 139

(56) References Cited

U.S. PATENT DOCUMENTS

| 5,764,834 A | * | 6/1998 | Hultermans | ................... | 385/60 |
| 6,769,814 B2 | * | 8/2004 | Kiani et al. | ................... | 385/78 |
| 6,776,533 B2 | * | 8/2004 | Gherardini | ................... | 385/59 |

* cited by examiner

*Primary Examiner*—Chandrika Prasad
(74) *Attorney, Agent, or Firm*—Roger C. Turner

(57) ABSTRACT

An optic fiber connection system in which a first connector (12) on a daughter board (32) can slide towards a second connector (14) on a mother board (20) until the daughter board is latched and the connectors are fully mated, which assures proper mating despite overtravel or undertravel of the daughter board. The first connector has a frame (30) fixed to the daughter board and a first connector body (34) that is slideable within the frame (30), against the biasing of body springs (112), so the body does not have to move further forward while the frame and daughter board continue to move forward to a fully installed daughter board position.

7 Claims, 4 Drawing Sheets

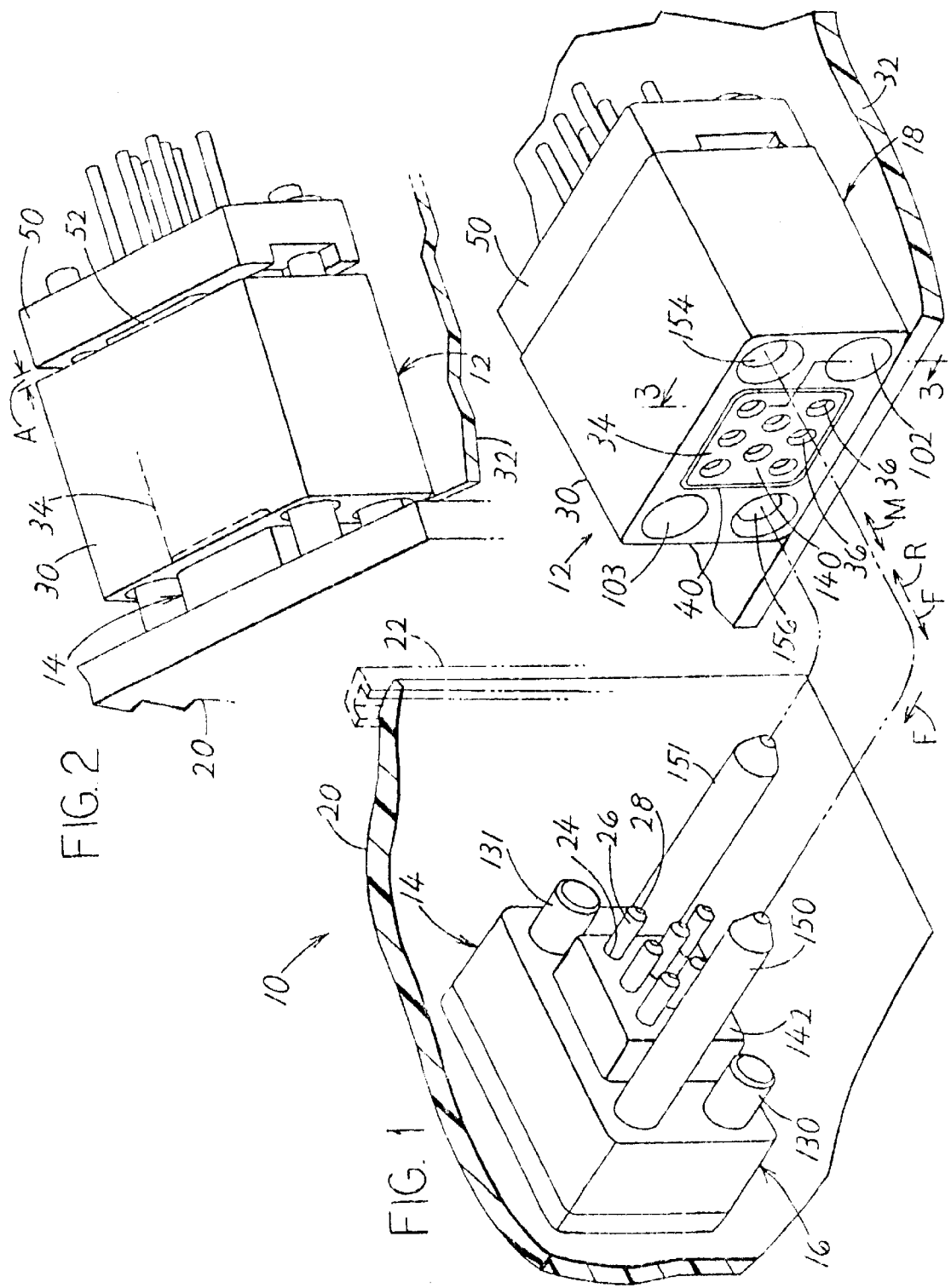

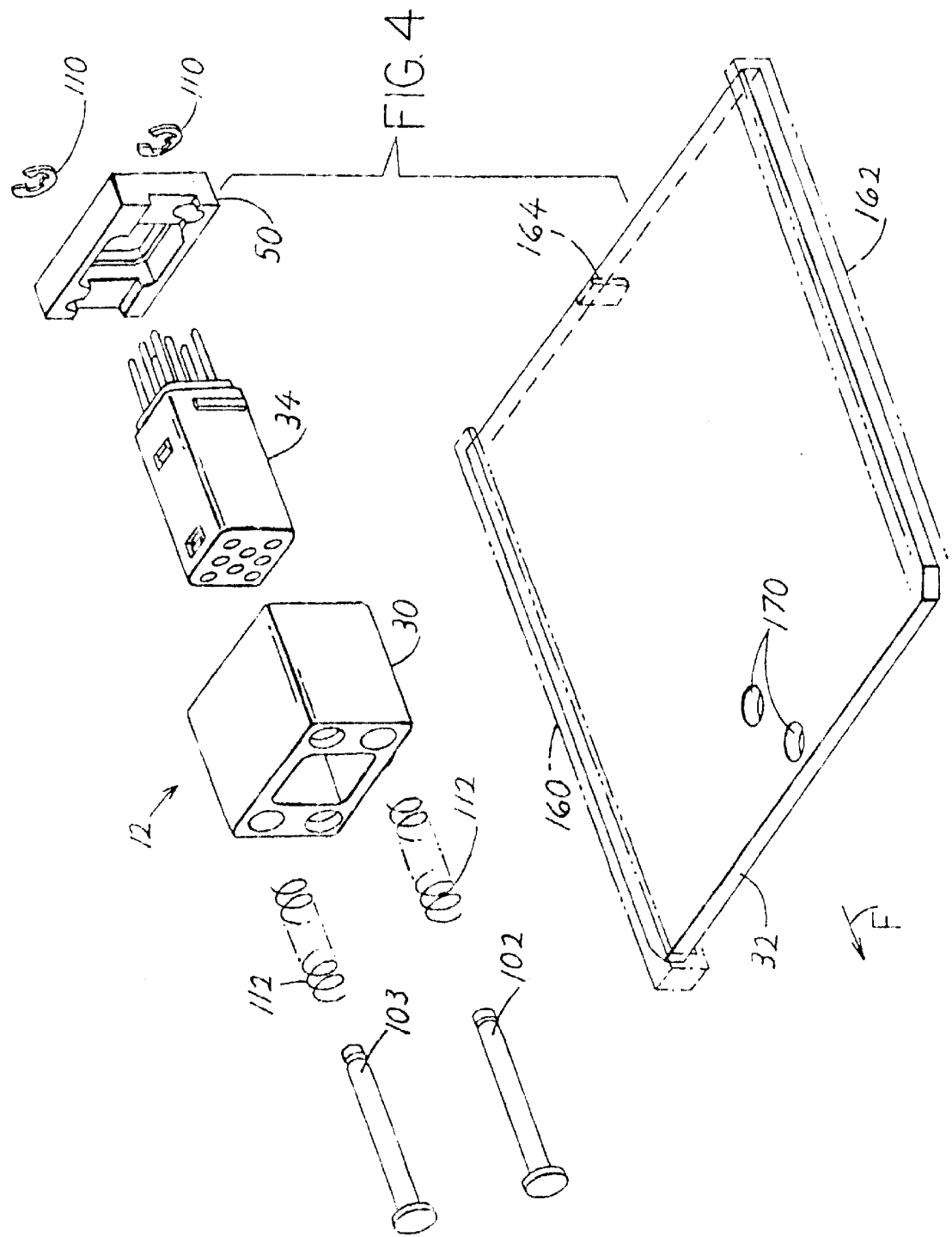

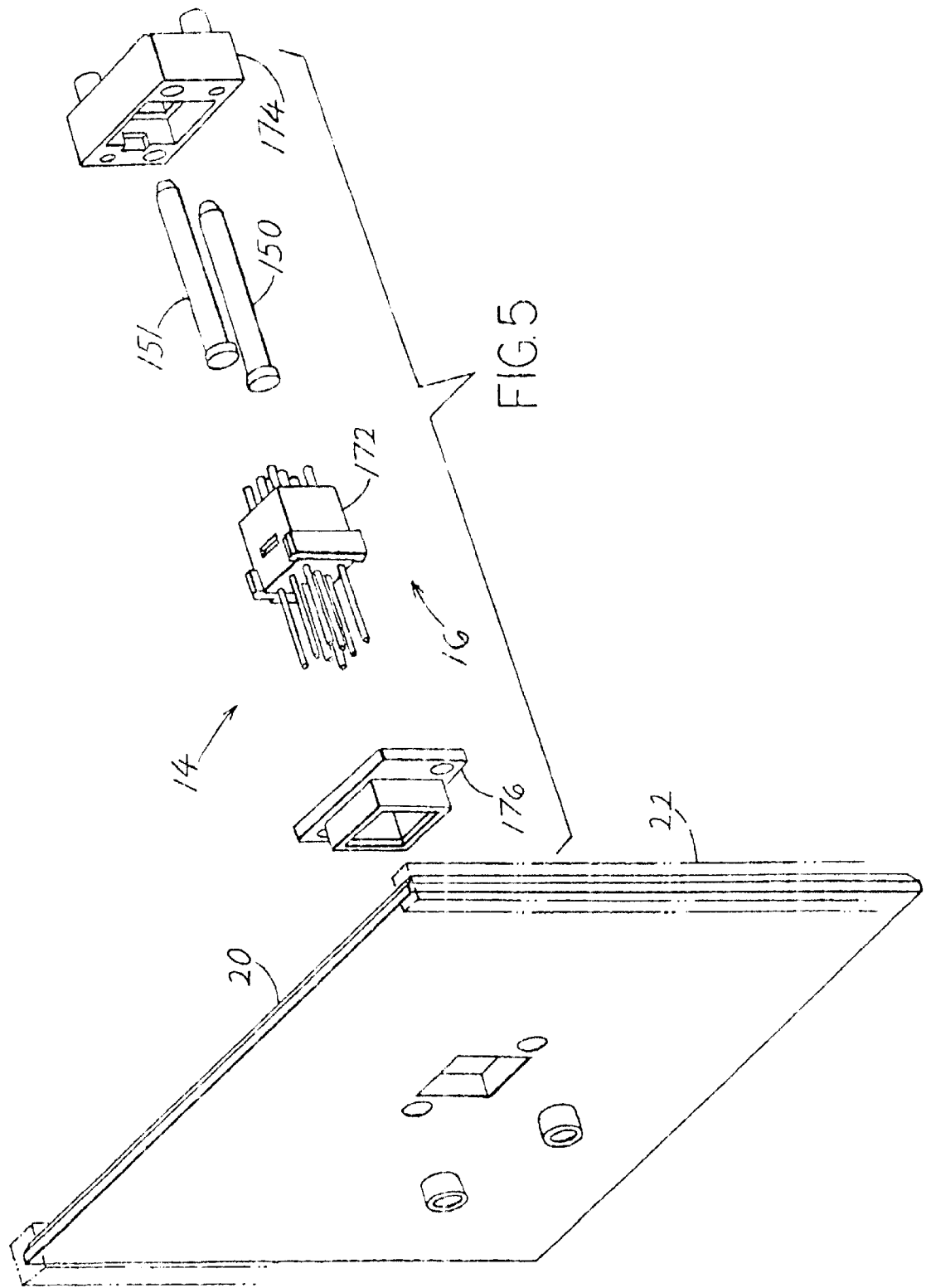

OPTIC FIBER CONNECTION SYSTEM WITH TERMINUS-HOLDING BODY SLIDABLE IN HOUSING

BACKGROUND OF THE INVENTION

A common situation is that a second optic fiber connector lies on a mother card or mother board that is fixed on a support, while a first connector lies on a daughter card or daughter board that can be slid along the support to a final position at which the first connector has fully mated with the second connector. A latch holds the daughter board in its fully installed position on the support. Because of accumulation of tolerances, the daughter board may continue to move forward after the first and second connectors are fully mated, until the daughter board is latched in place. It would be useful if the system could accommodate a range of fully installed daughter board positions while allowing limited movement of optic fibers of the two connectors towards each other to fully mated optic fiber positions. This should be accomplished in a system wherein a first connector frame is fixed to the daughter board.

SUMMARY OF THE INVENTION

In accordance with one embodiment of the present invention, an optic fiber connection system is provided which includes first and second mateable connectors, wherein the first connector has a body that holds optic fiber terminus assemblies that mate with terminus assemblies of the second connector by moving forwardly towards the second connector, the first connector also including a first frame that surrounds the first body. The first frame can slide forwardly while the first body remains stationary in a fully mated position, to accommodate forward sliding of a daughter board on which the first frame is fixed. Such forward sliding of the first frame is against the bias of a spring force that tends to slide the first frame rearward to an initial position relative to the first body.

In one system, a backup lies close behind the body and a pair of rods extend through bores in the backup and in the first frame, with front ends of the rods lying at the front of the first frame. Springs in the first frame bores bias the rods forwardly, to thereby bias the backup forwardly against the rear of the first body. As the first connector moves forwardly to mate, the optic fibers become fully mated. At that position, a pair of standoffs of the second connector engage front ends of the rods. Further forward movement of the first frame (and the daughter board on which the first frame is mounted) occurs while the rods, backup and body remain stationary.

The novel features of the invention are set forth with particularity in the appended claims. The invention will be best understood from the following description when read in conjunction with the accompanying drawings.

BRIEF DESCRIPTION OF THE DRAWINGS

FIG. 1 is an exploded isometric view of a connector system of the present invention, with the first and second connectors not yet mated, and showing the first and second connectors respectively mounted on a daughter board and a mother board.

FIG. 2 is an isometric view of the connector assembly of FIG. 1, with the connectors fully mated.

FIG. 4 is an exploded isometric view of the first connector of the system of FIG. 1, showing the daughter board, and showing in phantom lines a portion of the support.

FIG. 5 is an exploded isometric view of the second connector of FIG. 1, and the mother board, and showing in phantom lines a portion of the support of FIG. 4.

DESCRIPTION OF THE PREFERRED EMBODIMENT

Figure 3:
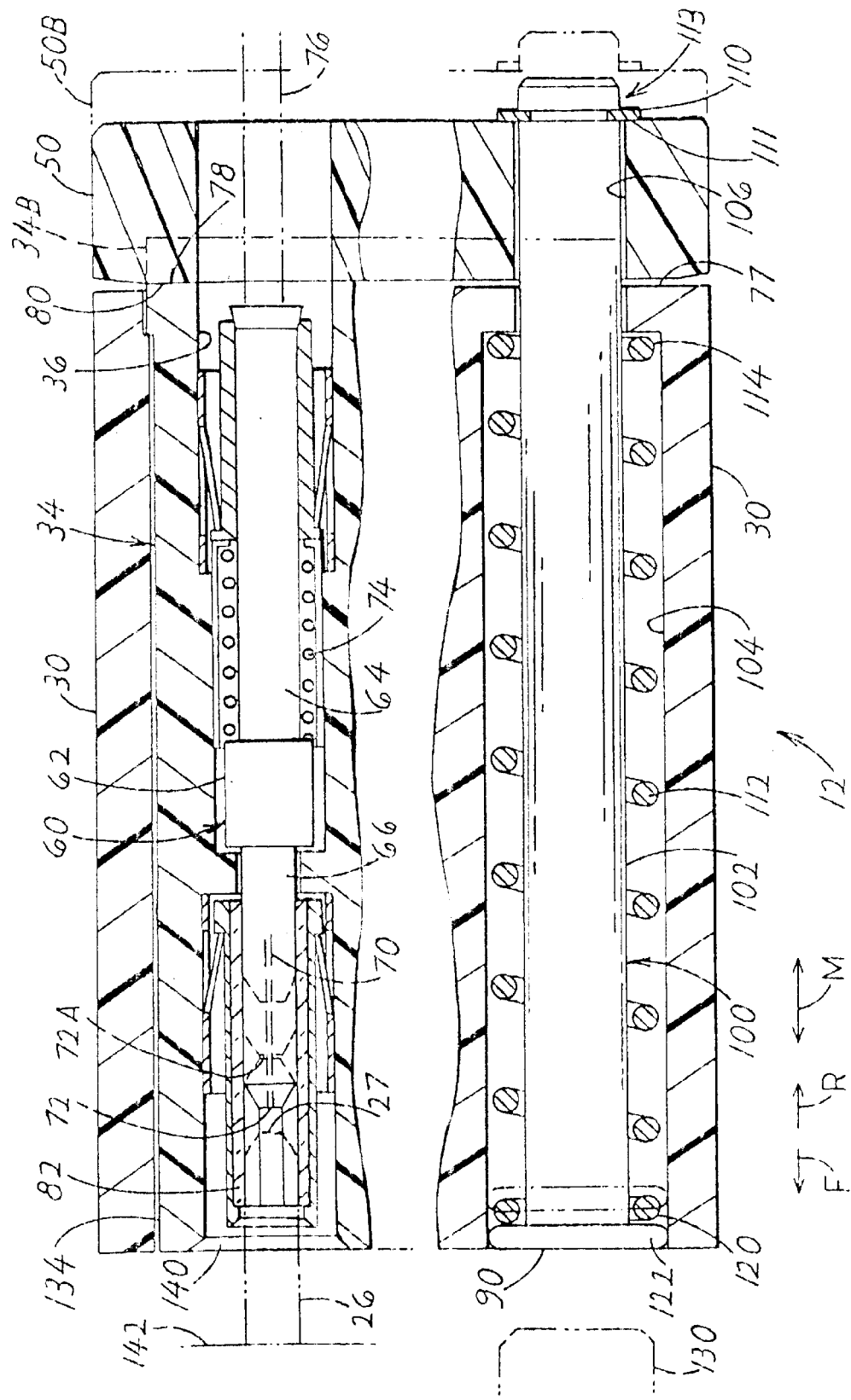
FIG. 3 is a sectional view of the first connector, taken on line 3—3 of FIG. 1.

FIG. 1 illustrates a connector system 10 of the present invention which includes first and second optic fiber connectors 12, 14 that can be mated. The second connector includes a second housing 16 that is fixed to a mother board 20. The mother board has been fixed in place in a support 22. The second connector housing 16 has passages 24 that hold second termini assemblies 26 with tips 28 where the tips of optical fibers lie. The first connector 12 includes a first housing 18 comprising a first frame 30 that is fixed to a daughter board 32. The first housing also includes a first body 34 with passages 36 that hold first terminus assemblies that mate with the second terminus assemblies 26 of the second connector.

The first body 34 lies within a frame passageway 40 of the first frame 30. The first body 34 is slideable in forward F and rearward R longitudinal M directions within the frame passageway. To connect the first and second connectors, the daughter board 32 is moved forwardly F towards the mother board 20 until the daughter board has been fully installed in the support 22. During such forward movement of the daughter board, the first body 34 with its first terminus assemblies, will move forward far enough that the tips 28 of the second terminii will have entered the first passages 36 of the first body 34 and will have fully mated with the first terminus assemblies. However, the daughter board 32 will continue to move forward a small additional distance until the daughter board has been fully installed on the support and is latched in place. During such additional movement of the daughter board 32, the first frame 30 will continue to move forward with the daughter board, while the first body 34 will not move any further forward.

FIG. 2 shows the first and second connectors 12, 14 in their fully mated positions. The first body 34 will have been stopped while the first frame 30 has slid forward around the first body. A backup 50, which originally abutted a rear end 52 of the first body, will not have moved forward with the first frame 30, so there will be a gap of length A between the backup 50 and first frame 30, representing the over travel of the daughter board 32 beyond the position wherein the terminus assemblies have become fully mated.

FIG. 3 illustrates the first connector 12, showing one of the first passages 36 and showing a terminus assembly 60 that lies in the passage. The terminus assembly includes a terminus 62 that has a terminus body 64 and a ferrule 66 through which an optic fiber 70 passes, with the tip 72 of the optic fiber lying even with the tip of the ferrule. A terminus spring 74 biases the terminus forwardly to the initial position shown in solid lines in FIG. 3. An optic fiber cable 76 trails from the terminus and passes through a hole in the backup 50. It can be seen that the first connector body 34 has a largely rearwardly facing shoulder 77 that abuts a forwardly-facing surface 80 of the backup 50.

A second terminus assembly at 26 with its tip at 27, enters an alignment sleeve 82 and abuts the tip 72 of the first terminus. The first terminus then moves rearwardly against the force of the terminus spring 74, until the tips of the two mating terminii reach position 72A which is about halfway between forward and rearward ends of the alignment sleeve 82. After such full mating, the first frame 30 continues to move forwardly F a short distance. It can be said that the body 34 and backup 50 move rearwardly R relative to the first frame 30, until the rear end of the body has moved to position 34B and the backup has moved to the position 50B. When the terminii tips 27, 72 have engaged and moved to the tip position 72A, a standoff 130 of the second connector first engages a front surface 90 of a rod 102, as will be described below.

A release or rod device 100 is provided, which includes a rod 102 that extends through bores 104, 106 in the frame 30 and in the backup 50, the rod device also including a clip 110 attached to a rear end of the rod. The rod 102 (and the opposite rod 103) and backup 50 form means 113 for urging the body forward. A body spring 112 lying within the bore 104, has a spring rear end 114 that abuts a frame shoulder, and has a spring front end 120 that abuts an enlarged rod front end 122. The spring urges the rod forwardly F, and its clip 110 has a largely forwardly-facing surface 111 that urges the backup 50 and first connector body 34 forwardly to the initial position shown in FIG. 3. The second connector has a standoff 130 that abuts the rod front surface 90 when the mating pairs of optical termini have fully mated, so the tips of the first termini have been pushed rearward to the positions 72A. The standoffs 130 allow the frame 12 to continue moving forward, while the standoff 130 prevents the rod 102 from moving forward. The rods therefore allow the backups 50 and body 34 to remain stationary in the fully mated positions of the pairs of mated termini. This keeps the body 34 in the fully mated position while allowing the frame 30 to move forward a small distance until the daughter board on which the frame is fixed, has been fully installed in the support. The rods and backup, plus the standoff, form an extension means for allowing the first frame to slide forward with respect to the first body.

FIG. 1 shows that the first connector 12 has two rods 102, 103 lying at opposite sides of the first connector, and in fact, at diagonally opposite corners of the primarily rectangular first connector frame. Two springs are provided, each surrounding one of the rods, each rod having a clip attached to its rear end. Similarly, the second connector 14 has a pair of standoffs 130, 131 that engage the front ends of both rods when pairs of optical fiber terminii have become fully mated. The abutment of the two rods applies forces symmetrically, and avoids large torque tending to tilt the backup 30 and the body 34. As shown in FIG. 3, the front 134 of the body "floats" in that it can shift slightly (on the order of magnitude of 0.5 degree) perpendicular to the longitudinal directions M to enable the termini to mate despite slight misalignment. During mating, the rear surface 142 (FIG. 1) of the second connector body preferably does not contact the front surface 140 of the first body.

The second connector has a pair of alignment pins 150, 151 that enter alignment bores 154, 156 in the first frame 30 as the connectors approach each other, to assure moderately accurate alignment of the connectors. Front ends of the first passages 36 are tapered, to further help alignment, with ultimate alignment of a pair of terminii ferrules being accomplished by the alignment sleeve 82 shown in FIG. 3.

FIG. 4 shows that the daughter board 32 is guided in its forward F movement by a pair of support guides 160, 162. A latch 164 with a moveable part mountable on the support or on the daughter board, latches the daughter board in its fully installed position when it has reached that position. The first frame 30 of the first connector 12 is fixed to the daughter board 32 by a pair of screws (not shown) that extend through holes 170 in the daughter board. FIG. 5 shows the construction of the second connector 14. The housing 16 of the second connector includes a second connector body 172 that is fixed in a second connector frame 174, with the fixing occurring so the second body 172 and frame 174 cannot move relative to one another. A coupling 176 fixes the second frame 174 to the mother board 20.

In the connection system that applicant has designed, each of eight first terminus assemblies had terminus springs 74 (FIG. 3) that were pre-loaded to a force of 0.6 pounds, so that all eight springs applied an initial force of 4.8 pounds. Each of the body springs 112 were pre-loaded to a force of 4 pounds, so the body springs urged the body forwardly with a force of 8 pounds. The 8-pound force urging the body forwardly, easily overcomes the rearward force of about 5 pounds that is applied by the eight second terminus assemblies when they deflect the first terminus assemblies rearwardly to the preferred final positions of the terminii. This avoids a situation in which the first body has been moved rearward under the forces applied to it by the terminus springs during mating.

In the designed system, the final gap A (FIG. 2) was designed to be 30 mils (one mil equals one thousandth inch). Tolerances were allowed which resulted in a gap of between 1 mil and 60 mils. The tolerances that resulted in variation in gap width, included tolerances in the exact position of the daughter board 32 when it was fully latched, in the position of the first frame 30 on the daughter board 32, in the position of the second connector on the mother board, and the position of the mother board 20.

It would be possible to slideably mount the first body in the first frame, without the use of the backup and rods and with the rear face (142) of the second connector housing directly abutting the front face (140) of the first body. During mating, one or more springs then could extend directly between the first body and first frame. However, this could lead to forceful tilting of the first body by the rear face (142) of the second connector and/or by the spring(s). Thus, this alternate is not preferred, although possible.

Thus, the invention provides an optic fiber connection system with first and second connectors that each have passages that hold optic fiber terminus assemblies that can mate when the connectors mate, but which allows a frame of the first connector to move in a forward mating direction further than is required for mating without causing corresponding further forward movement of the first terminus assemblies in the first connector. The first connector includes a first body that is slideable rearwardly with respect to a first connector frame, and a body spring apparatus with two springs that urge the first body forwardly towards an initial position while allowing the first body to slide rearwardly by a limited distance relative to the first frame. An extension means that couples the body springs to the body, can include a pair of rods that are biased forwardly by a pair of body springs, with rear ends of the rods having clips or other parts that limit rearward movement of a backup. The backup abuts the rear of the body to prevents its rearward movement relative to the frame unless the rods are deflected rearwardly.

The novel features of the invention are set forth with particularity in the appended claims. The invention will be best understood from the following description when read in conjunction with the accompanying drawings.

What is claimed is:

1. An optic fiber connection system which includes first and second mateable connectors that each have a housing, each housing having at least one body passage extending in front and rear longitudinal directions and each connection system including at least one of a pair of mateable optic fiber terminus assemblies, with at least a first one of said terminus assemblies including a terminus and a terminus spring that biases the terminus toward the mating terminus assembly, wherein:

the first housing of said first connector includes a first frame and a first body slideable in longitudinal directions in said first frame, said at least one body passage in said first housing being formed in said first frame;

a pair of body springs and means connected to said body spring for urging said body forward with respect to said first frame, said means having a pair of front surface locations that lie on opposite sides of said passage, said front surface locations being exposed to be pressed rearward to prevent further forward movement of the first body, said second housing has a pair of standoffs positioned to engage said pair of front surfaces, to stop further forward urging of said body by said pair of body springs.

2. The connection system described in claim 1 wherein:

said means for urging includes a backup with a first part that lies directly behind said frame, and with a second part that has a largely forwardly-facing surface that abuts said first connector body to limit rearward movement of said first connector body, and said means for urging also includes a pair of rod devices that each is slideably mounted in said frame, said rod devices forming said front surface locations and having forwardly-facing surfaces that abut said backup to limit rearwardly sliding of said backup with respect to said rod devices, said body springs bias said rod devices forwardly while allowing them to move rearwardly against biasing of said body springs.

3. The connection system described in claim 2 wherein:

said frame has a longitudinally-extending bore with a rear end forming a bore rear shoulder, said rod devices each has a rod that lies partially in said bore and that is longitudinally slideable therein, and said body springs each lies in one of said bores around one of said rod devices;

said rod devices each has a front end forming a shoulder that abuts a front end of said second spring, said body springs each having a rear end that abuts one of said bore rear shoulders, and said rods each has a rear end that passes rearwardly through one of said body spring rear ends and said rod devices each has a largely forwardly-facing shoulder that abuts said backup to urge it forward.

4. The connection system described in claim 2 including a terminus alignment sleeve, said first of said terminus assemblies initially lying in said alignment sleeve in an initial position, and said first terminus assembly is slideable rearwardly from said initial position to a rearward terminus position after the tips of the two mating termini are engaged and said tips move rearward relative to said first body, and a daughter board on which said first connector is mounted and a mother board on which said second connector is mounted, said mother board being fixed in position on a support wherein said support has a guideway that guides said daughter board in sliding toward said mother board until said daughter board is latched in a fully installed position, wherein:

said standoffs first abut said rod device front ends when said connectors are close enough together that said terminus tips are engaged with each other and said first terminus has slid rearward to said rearward first terminal position.

5. The connection system described in claim 2 wherein:

said first frame has opposite corners, and said first and second rod devices and said front surface locations are located at said opposite corners, and said first and second body springs are also located at said opposite corners.

6. An optic fiber connection system which includes first and second connectors that each has a housing with a plurality of body passages extending in front and rear longitudinal directions, and a plurality of pairs of mateable terminus assemblies with one terminus assembly of each pair lying at least partially in one of said housings and the other terminus assembly of the pair lying at least partially in the other housing and with the pair of terminus assemblies having tips abutting each other, at least a first terminus assembly of each mateable pair having a terminus spring that urges the terminus of the first terminus assembly towards the mating terminus while allowing the first terminus to be moved rearward by the mating terminus so the pairs of termini reach fully mated positions, a first of said housings includes a first frame and a first body that is slideable rearwardly from an initial position to a rearward position with respect to said first frame, and a plurality of body springs that urge said first body forwardly with respect to said first frame toward said initial position when said frame has continued to move forward but said body has not, wherein;

when all of said passages contain terminus assemblies and said connectors are fully mated, the total force applied by said terminus springs to said first body urging it rearwardly is a predetermined value;

the total force applied by said body springs urging said first body forwardly with respect to said frame is greater than said predetermined value, whereby to assure that said termini are all fully mated before said first body can stop moving forward as said first frame continues to move forward.

7. An optic fiber connection system which includes first and second connectors that each has a housing with a plurality of body passages extending in front and rear longitudinal directions, and a plurality of pairs of mateable terminus assemblies each terminus assembly lying at least partially in a passage of a different one of said housings and each pair of terminus assemblies being mateable by tips of termini of the pair abutting each other, at least a first terminus assembly of each mateable pair having a terminus spring that urges a terminus of the first terminus assembly towards the mating terminus while allowing the first terminus to be moved rearward by the mating terminus so the pairs of termini reach fully mated positions, a first of said housings includes a first frame and a first body that is slideable rearwardly from an initial position to a rearward position with respect to said first frame, including:

a backup with portions that lie behind said first frame and behind said body;

at least two bores extending in forward and rearward directions through said first frame, and at least two holes extending through said backup;

at least two rod devices each extending through one of said bores and one of said holes and having a rear end that abuts said backup, and each rod device having a front end accessible from the front of said frame;

at least two body springs that each biases one of said rods forwardly with respect to said frame;

said second connector having a pair of standoffs each positioned to engage the front end of one of said rods as said connectors approach each other to mate their pairs of terminus assemblies.

* * * * *